United States Patent
Neal et al.

(10) Patent No.: US 7,141,799 B1
(45) Date of Patent: Nov. 28, 2006

(54) FIBER OPTIC THERMAL/FAST NEUTRON AND GAMMA RAY SCINTILLATION DETECTOR

(75) Inventors: John S. Neal, Knoxville, TN (US); John T. Mihalczo, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 119 days.

(21) Appl. No.: 11/094,679

(22) Filed: Mar. 30, 2005

(51) Int. Cl.
*G01T 3/06* (2006.01)
(52) U.S. Cl. ............................................. 250/390.11
(58) Field of Classification Search ............ 250/390.11
See application file for complete search history.

(56) References Cited

U.S. PATENT DOCUMENTS

| | | | |
|---|---|---|---|
| 4,931,646 A * | 6/1990 | Koechner et al. ........... | 250/367 |
| 5,231,290 A | 7/1993 | Czirr et al. | |
| 5,298,756 A * | 3/1994 | McCollum et al. .... | 250/390.07 |
| 5,680,423 A | 10/1997 | Perkins et al. | |
| 6,011,266 A | 1/2000 | Bell | |
| 6,707,047 B1* | 3/2004 | Craig et al. ............. | 250/390.04 |
| 2002/0130267 A1* | 9/2002 | Odom et al. ........... | 250/390.11 |
| 2002/0130268 A1* | 9/2002 | Odom et al. ........... | 250/390.11 |
| 2005/0023479 A1* | 2/2005 | Grodzins ................ | 250/390.11 |
| 2005/0104002 A1* | 5/2005 | Shah ....................... | 250/363.03 |
| 2005/0105665 A1* | 5/2005 | Grodzins et al. ........... | 376/157 |
| 2005/0224719 A1* | 10/2005 | Polichar et al. ........ | 250/390.01 |

OTHER PUBLICATIONS

Abel K.H. et al, "Scintillating-Glass-Fiber Neutron Sensors", Nuclear Instruments and Methods in Physics Research, vol. A353, 114-117, 1994.
Usuda S. et al, "Phoswich Detectors for Simultaneous Counting of $\alpha$-,$\beta$ ($\gamma$)-Rays and Neutrons", Nucl. Instrum. & Meth. in Physics Research, vol. A388, 193-198, 1997.
Takada, M. et al, "Development of a Phoswich Detector to Detect Neutrons and Charged Particles for Space Applications.", IEEE Trans Nucl Sci, vol. 45, No. 3, 888-893, 1998.
Seymour, R.S. et al, "Scintillating-Glass-Fiber Neutron Sensors, Their Appl. and Perf. for Plutonium . . . ", J. of Radioanalytical and Nuc. Chem, vol. 243, No. 2, 387-388, 2000.
Peurrung, A.J., "Recent Developments in Neutron Detection", Nuclear Instruments and Methods in Physics Research, vol. A443, 400-415, 2000.
Mihalczo, J.T. et al, "Physical Description of Nuclear Materials Identification System (NMIS) Signatures", Nuc. Instrum and Meth in Physics Research, vol. A450, 531-555, 2000.

* cited by examiner

*Primary Examiner*—David Porta
*Assistant Examiner*—Marcus Taningco
(74) *Attorney, Agent, or Firm*—Joseph A. Marasco; James M. Spicer (57) ABSTRACT

A detector system that combines a $^6$Li loaded glass fiber scintillation thermal neutron detector with a fast scintillation detector in a single layered structure. Detection of thermal and fast neutrons and ionizing electromagnetic radiation is achieved in the unified detector structure. The fast scintillator replaces the polyethelene moderator layer adjacent the $^6$Li loaded glass fiber panel of the neutron detector and acts as the moderator for the glass fibers. Fast neutrons, x-rays and gamma rays are detected in the fast scintillator. Thermal neutrons, x-rays and gamma rays are detected in the glass fiber scintillator.

9 Claims, 7 Drawing Sheets

FIBER OPTIC THERMAL/FAST NEUTRON AND GAMMA RAY SCINTILLATION DETECTOR

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

1. Field of the Invention

The present invention relates to detectors of neutrons and gamma rays. More particularly, a fast scintillator detector replaces the polyethylene moderator adjacent the glass fiber structure of a $^6$Li loaded glass scintillator fiber-optic thermal neutron detector. The unified detector that results is sensitive to thermal and fast neutrons as well as ionizing electromagnetic radiation such as x-rays and gamma rays.

2. Description of the Prior Art

Devices are needed that can detect and characterize neutron and ionizing electromagnetic radiation sources in large objects at large distances. Such devices are of great interest for detecting and monitoring the movement of fissile and other nuclear materials. Gamma detectors and helium monitors are used at transportation portals for monitoring people, vehicles and large trucks.

In these applications, large area detectors are necessary for the collection of low source strength radiations within reasonable detection times. What is a reasonable time may be dictated by the economic costs associated with the slowing down of personnel and goods.

A viable alternative, in terms of radiation detection, is the employment of many detectors to cover the same area. Many detectors, however, carry the burden of associated electronics, cables, and processing electronics.

Fast plastic scintillation detectors are favored for use in portal monitors because of their sensitivity to gamma rays, and also because they can be made in large sizes inexpensively. The fast plastic output light can be used to measure time correlations of neutrons and gamma rays that characterize the fission chain multiplication processes in plutonium, uranium or other materials. The time dependent coincidence counts between pairs of detectors can and has been used in the past to characterize fissile material.

Another device that is applicable to the radiation detection problem is the $^6$Li loaded glass fiber detector where $^6$Li loaded glass fibers are embedded in polyethylene. The polyethylene moderates the fast neutrons and allows their subsequent absorption by the $^6$Li.

In the conventional $^6$Li detector, the $^6$Li loaded glass fibers are embedded in a polyethylene slab that can be up to one meter long. Since the glass fibers detect thermal neutrons preferentially, fast neutrons from fission must be slowed to low energy to be detected by the $^6$Li (n$\gamma$) reaction. To achieve this, additional polyethylene of various thicknesses is placed in front and back of the fiber panels to form a thermal neutron detector. The light produced in the fibers is collected at both ends and viewed by photomultiplier tubes. Electrical pulses produced by the photomultiplier tubes can be counted in coincidence or not. Coincidence counting eliminates photomultiplier and other electronic noise contributions.

The $^6$Li fiber optic detectors are designed for high-efficiency thermal neutron detection, and their utility for thermal coincidence counting and multiplicity counting is known. The time constants (~100 ns) of the fission chain multiplication and decay processes of fissile material cannot be observed with the $^6$Li fiber optic detectors due to the polyethelene moderator (10's of microseconds) used in the detector. The time distribution of coincident counts only includes information about the moderator, although the amplitude is related to the quantity of fissile material.

The present invention is a unified layer structure merging a $^6$Li loaded glass scintillation fiber-optic thermal neutron detector with a fast scintillation detector. Detection of thermal and fast neutrons and ionizing electromagnetic radiation is achieved in a single detector structure.

REFERENCES

1. U.S. Pat. No. 5,231,290, J. B. Czirr and G. L. Jensen, "Neutron Coincidence Detectors Employing Heterogeneous Materials", issued Jul. 27, 1993.
2. U.S. Pat. No. 5,680,423, R. W. Perkins, P. L. Reeder, N. A. Wogman, R. A. Warner, D. W. Brite, W. C. Richey and D. S. Goldman, "Method and Apparatus for Detecting Neutrons", issued Oct. 21, 1997.
3. U.S. Pat. No. 6,011,266, Z. W. Bell, "Apparatus and Method for the Simultaneous Detection of Neutrons and Ionizing Electromagnetic Radiation", issued Jan. 4, 2000.
4. K. H. Abel, R. J. Arthur, M. Bliss, D. W. Brite, R. L. Brodzinski, R. A. Craig, B. D. Geelhood, D. S. Goldman, J. W. Griffin, R. W. Perkins, P. L. Reeder, W. R. Richey, K. A. Stahl, D. S. Sunberg, R. A. Warner, N. A. Wogman, and M. J. Weber, "Scintillating-Glass-Fiber Neutron Sensors", Nuclear Instruments and Methods in Physics Research, Volume A353, 114–117, 1994.
5. S. Usuda, S. Sakurai, and K. Yasuda, "Phoswich Detectors for Simultaneous Counting of $\alpha$-, $\beta(\gamma)$-Rays and Neutrons", Nuclear Instruments and Methods in Physics Research, Volume A388, 193–198, 1997.
6. M. Takada, S. Taniguchi, T. Nakamura, and K. Fujitaka, "Development of a Phoswich Detector to Detect Neutrons and Charged Particles for Space Application", IEEE Transactions on Nuclear Science, Vol. 45, No. 3., 888–893, 1998.
7. R. S. Seymour, B. Richardson, M. Morichi, M. Bliss, R. A. Craig, and D. S. Sunberg, "Scintillating-Glass-Fiber Neutron Sensors, their Application and Performance for Plutonium Detection and Monitoring", Journal of Radioanalytical and Nuclear Chemistry, Vol. 243, No. 2, 387–388, 2000.
8. A. J. Peurrung, "Recent Developments in Neutron Detection", Nuclear Instruments and Methods in Physics Research, Volume A443, 400–415, 2000.
9. J. T. Mihalczo, J. A. Mullens, J. K. Mattingly, and T. E. Valentine, "Physical Description of Nuclear Materials Identification System (NMIS) Signatures", Nuclear Instruments and Methods in Physics Research, Volume A450, 531–555, 2000.

BRIEF SUMMARY OF THE INVENTION

In a first preferred embodiment, a layer structure for detecting externally originating fast neutron, thermal neutron, and electromagnetic ionizing radiation comprises: a fast scintillator layer for receiving incoming fast neutron, thermal neutron, and electromagnetic ionizing radiation, the fast scintillator layer capable of detecting fast neutrons, x-rays and gamma rays; a plurality of Li-6 loaded glass fiber layers capable of detecting thermal neutrons, x-rays and gamma rays; a plurality of neutron moderating layers alternating between the Li-6 loaded glass fiber layers; a light shielding material surrounding the Li-6 loaded glass fiber layers and the polyethylene layers; a high atomic number material layer; and a neutron reflection layer.

In another preferred embodiment, a system for detecting fissile and fissionable material originating external to the system comprises: a $^6$Li loaded glass fiber scintillator capable of detecting thermal neutrons, x-rays and gamma rays; a fast scintillator capable of detecting fast neutrons, x-rays and gamma rays, the fast scintillator conjoined with the glass fiber scintillator such that the fast scintillator moderates fast neutrons prior to their detection as thermal neutrons by the glass fiber scintillator; and a coincidence detection system for processing the time distributions of arriving signals from the scintillators.

DETAILED DESCRIPTION OF THE INVENTION

The multiple radiation detector of this invention results from uniting two radiation detectors and coincidence techniques in a unique manner for the simultaneous detection of fast and thermal neutrons and ionizing electromagnetic radiation.

Figure 1:
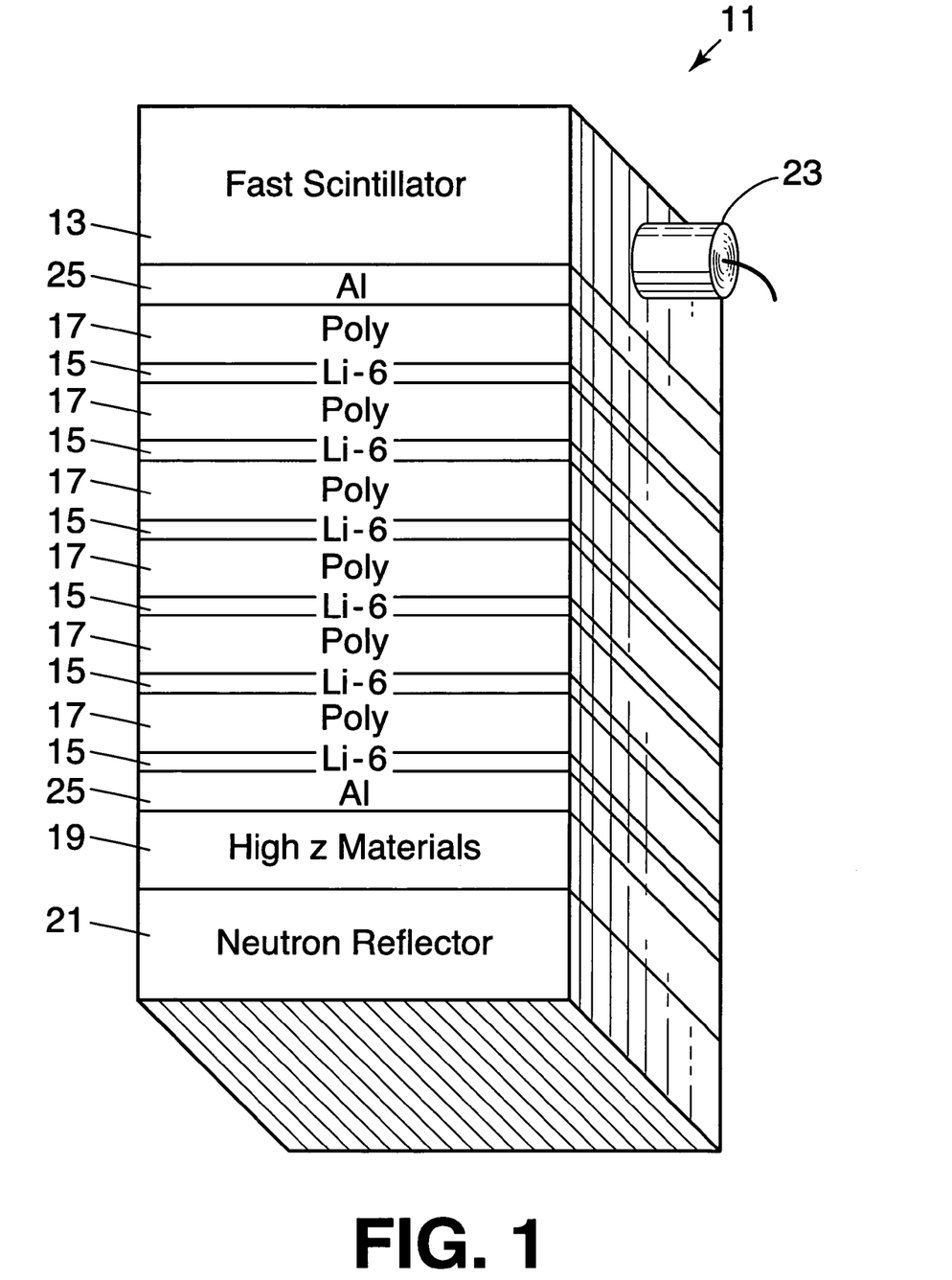
FIG. 1 illustrates a fast neutron, thermal neutron, and electromagnetic ionizing radiation detector based on a fast scintillator in accordance with the present invention.

Referring to FIG. 1, the multiple radiation detector 11 includes a fast scintillator layer 13 coupled to one or more photon sensitive detectors 23. The photon sensitive detectors 23 can be photomultiplier tubes or photodiodes, for example, and are arranged for detecting light scintillations that occur in the fast scintillator 13. The next layers are an array of $^6$Li loaded glass fiber scintillators 15 with intervening layers of neutron moderating materials 17. An aluminum or other metal case 25 encloses the glass fiber scintillator layers 15 and associated moderator layers 17 in a light and water tight enclosure.

The high atomic number (high Z) material 19 is a gamma and x-ray shield that reduces background radiation from behind the detector layer structure. The radiation shielding material 19 may be a combination of materials such as lead, copper, or tungsten. The arrangement of moderator layers 17 and the shielding materials layer 19 dictate the detector's sensitivity to different portions of the neutron and/or ionizing electromagnetic radiation spectrum. A neutron reflector layer 21 completes the layer structure of the detector 11. The layer 21 may be a hydrogenous material that slows neutrons and keeps them in the system.

In the fast scintillator 13, fast neutrons are detected via neutron scattering interactions with the hydrogen and carbon nuclei that constitute the scintillator 13. The scattering interaction transfers kinetic energy from the neutron to the hydrogen or carbon nucleus which then behaves as a charged particle. That is, it loses its energy in the scintillator and converts a portion of that energy to light that is detected by the detectors 23.

Fast scintillator detectors are sensitive to ionizing electromagnetic radiation. The low atomic number value of elements that make up a fast scintillator have a small photoelectric cross section which results in most ionizing electromagnetic radiation interactions occurring as Compton scatterings. The resultant Compton electrons and other subsequently produced electrons lose energy in the scintillator 13 and convert a portion of that energy to light which is detected with the photomultiplier tubes or photodiodes 23.

The $^6$Li loaded silicate glass scintillator fibers detect thermal neutrons via the absorption of thermal neutrons by $^6$Li nuclei. These glass fibers are typically enriched in $^6$Li to enhance the chance for neutron absorption. The glass fibers are doped with $^{3+}$Cerium ions to ensure fast scintillation response so that the detector may be operated in a pulse mode, producing individual electronic pulses for each event.

The absorption reaction produces an alpha particle and a triton with ranges in glass of ~7 and ~40 microns respectively. A glass fiber diameter should be several times larger than these ranges to insure complete energy deposition. Secondary electrons produced by ionizing electromagnetic radiation interactions have a range on the order of a millimeter. A compromise can be struck between neutron and ionizing electromagnetic radiation sensitivity with the selection of the glass fiber diameter.

The charged particles produced by either neutrons or ionizing electromagnetic radiation transfer a portion of their energy to the $^{3+}$Cerium ions which then produce light that is transported through the glass fiber and detected by the photomultiplier tube or a photodiode. Various $^{3+}$Cerium ion concentrations and glass fiber claddings may be used to improve the scintillation light output from the glass fibers.

The neutron detection efficiency and sensitivity to selected portions of the neutron spectra may be controlled through the use of the layers of neutron moderating material 17. Typically, polyethylene, ethafoam, or other hydrogenous materials are known for this purpose. The radiation shielding materials 19 are shown as one layer in FIG. 1, but could also be located among the $^6$Li glass fiber layers 15.

The fast scintillator 13 serves both as a detector of neutrons and ionizing electromagnetic radiation while acting as a moderating material for the $^6$Li loaded glass fiber scintillator layers 15. While the glass fibers are sensitive to both neutrons and ionizing electromagnetic radiation, the selection of fiber diameter and pulse discrimination techniques reduce the sensitivity to ionizing electromagnetic radiation.

The fast scintillator layer 13 and the glass fiber scintillator layers 15 must be optically separated from each other so as not to confuse their respective signals. All interior surfaces of the fast scintillator 13 may be coated with a specular or diffusive medium such as aluminum or Teflon. The aluminum case 25 also serves this purpose.

Figure 2:
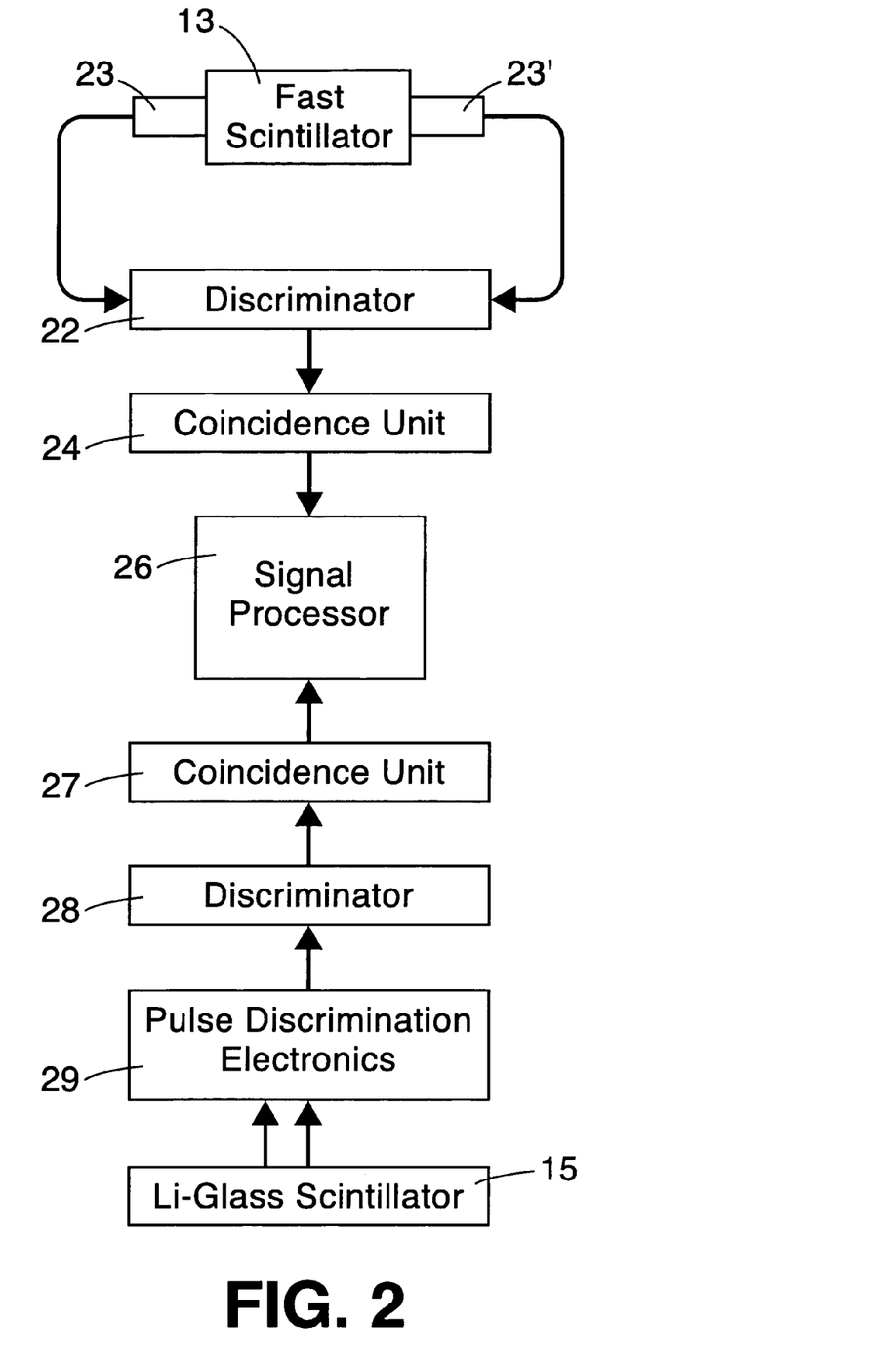
FIG. 2 is an illustration of a fast neutron, thermal neutron, and electromagnetic ionizing radiation detection system based on the detector of FIG. 1.

FIG. 2 shows a coincidence system suitable for processing electrical signals from the fast scintillator 13 and the Li-loaded glass scintillator 15. The coincidence system may comprise standard nuclear electronic processing components including discriminators 22, 28, coincidence units 24, 27, and a signal processor 26 for producing system time correlations, multiplets, multiplicities, and Feynman variances. The Li-loaded glass scintillator 15 also utilizes pulse discrimination electronics 29 for sorting neutrons and ionizing electromagnetic radiation.

In FIG. 2, the coincidence units 24, 27 condition the electrical signals out of the scintillators 13, 15, respectively. The parameter of interest is the timing of the signals, i.e., when the electrical signals from the scintillators were formed. The electronics mark the time of origination of the signals in the system. The signal processor 26 aligns the timing of the different signals in different ways in order to form a relationship of the time of origin of the respective signals. Within that relationship is the information relating to physical properties of the objects like time correlations, multiplets, multiplicities, Feynman variances, etc.

As mentioned above, coincidence techniques are used for both the fast scintillator detector 13 and the glass fiber scintillator 15 detector. The Nuclear Materials Identification System (NMIS) (Mihalczo 2000) or any other properly configured coincidence measurement system may be used to measure neutron and/or ionizing electromagnetic radiation multiplicity or the time distribution of coincident counts. Both of these signatures are indicative of fission events.

Coincidence measurements for the fast scintillator 13 and the glass fiber scintillator detector 15 sample different time scales. The fast scintillator 13 detects events occurring on a time scale of 10's to 100's of nanoseconds. The glass fiber scintillator 15 detects events occurring on a time scale of 10's of microseconds. The information associated with these two time scales may be used separately or analyzed together to produce a unique signature for detection of fissile or other nuclear materials of interest.

The photomultipliers 23, 23' observe the light output at each end of the fast scintillator 13 and can be used in coincidence to reduce noise effects. Associated circuitry includes discriminators for the anode signals from the photomultiplier and coincidence circuitry.

In operation, the multiple radiation detector 11 is sensitive to slow neutrons, fast neutrons, x-rays and gamma rays. The fast scintillator 13 is sensitive to fast neutrons by the proton recoil process. The polyethylene moderator that is normally used in a $^6$Li detector is replaced with the fast scintillator 13 that is optically coupled to the fast photomultiplier tubes 23 located on both ends of the scintillator block 13. Fast neutrons incident upon the fast scintillator produce light by the proton recoil process for detection. Light pulses produced in the fast scintillator signal the detection of a fast neutron.

In the subject detector, a fast neutron is detected in the fast scintillator 13 when it deposits its energy mainly by elastic scattering with the hydrogen or carbon in the scintillator 13. After the neutron has lost its energy, it diffuses in the system until the slowed down neutron is absorbed by the $^6$Li of the glass fibers. Gamma rays interact with the electrons of the fast scintillator.

The time correlation data from the fast scintillator occurs on the time scale of the fission chain multiplication processes in the fissile material. The time constraints of the $^6$Li glass fiber detector depend primarily on the moderator configuration because of the slowing down time of the fast neutrons which is 10's of microseconds. Thus, the detection system correlation will exhibit two time constraints; one associated with the fissile system, and the other associated with the moderator.

A system such as NMIS will acquire time coincidence distributions, multiplets, multiplicities, and Feynman variance from each detector or the sum of detectors between pulses from the accelerator. Existing detectors for this type of use rely on (n n) coincidences. These detectors and this system will also detect (n γ) and (γ γ) coincidences which are at least an order of magnitude more numerous.

There are at least the following distinct embodiments of this invention, all of which involve alternative radiation detection materials for the fast scintillator 13 of FIG. 1. These include organic plastic scintillators (FIG. 3), high atomic number loaded plastic scintillators to improve energy resolution for ionizing electromagnetic radiation interactions (FIG. 4), liquid organic scintillators to allow pulse shape discrimination in order to distinguish neutron and ionizing electromagnetic radiation interactions (FIG. 5), large glass scintillator sheets (FIG. 6), and large transparent polycrystalline ceramic scintillator sheets (FIG. 7).

Figure 3:
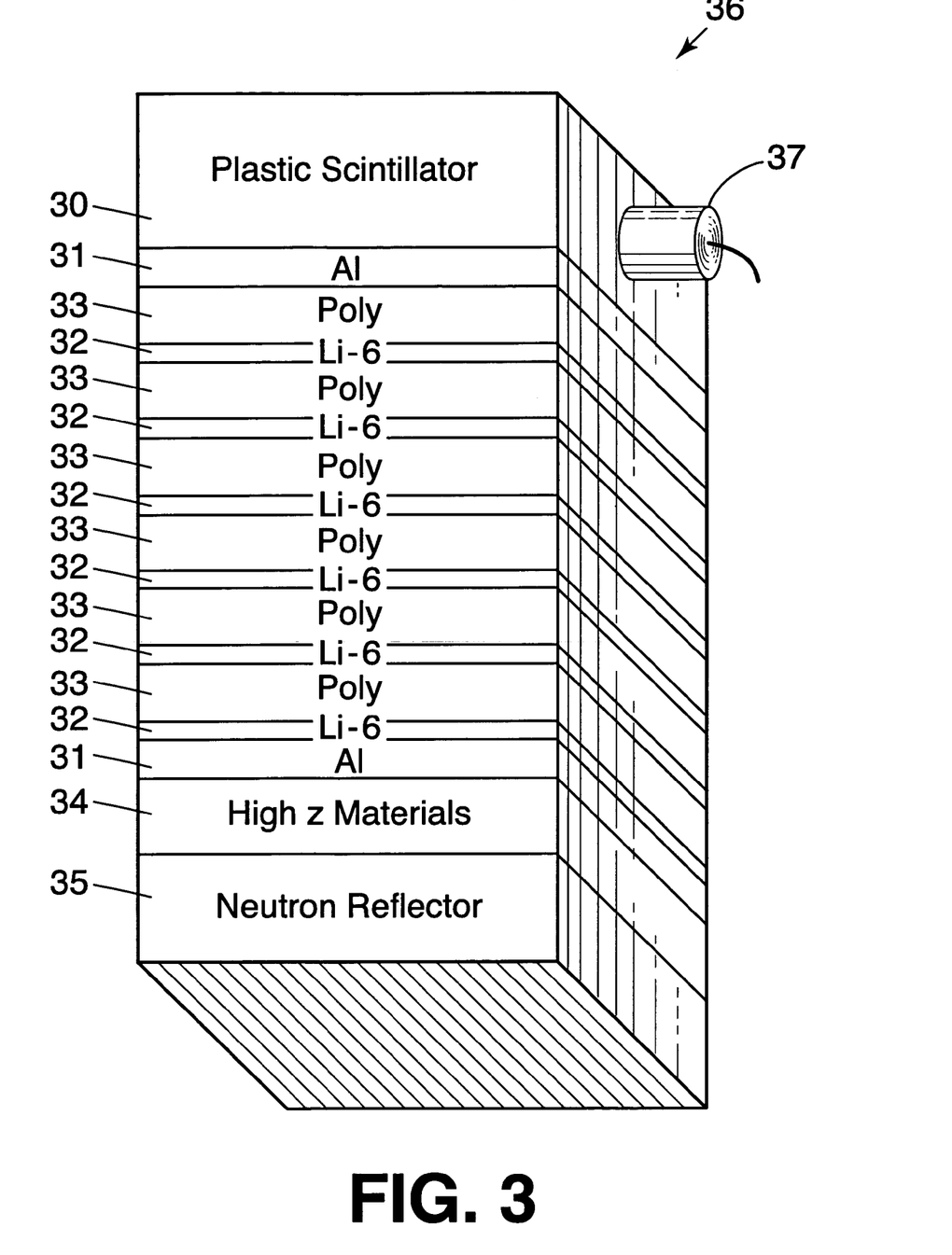
FIG. 3 illustrates a fast neutron, thermal neutron, and electromagnetic ionizing radiation detector based on an organic plastic scintillator in accordance with another embodiment of the present invention.

In the embodiment of FIG. 3, an organic plastic scintillator layer 30 replaces the fast scintillator layer 13 in the layer structure of FIG. 1. The organic plastic scintillator layer 30 is optically isolated but in close proximity to the rest of the detector as in FIG. 1. The other layers in FIG. 3 are the same as in FIG. 1. An aluminum or other metal case 31 serves to contain the $^6$Li loaded glass fiber scintillation layers 32 and associated moderator materials 33 in a light and water tight enclosure. The moderator 33 can be a hydrogenous material such as polyethylene or ethafoam. As in FIG. 1, the $^6$Li loaded glass fiber scintillators 32 are arranged in alternating layers with the moderator 33. A high density (high atomic number) material 34 is used for shielding against ionizing electromagnetic radiation. Layer 35 is a hydrogenous material such as polyethylene or ethafoam used as a neutron reflector. The order of placement of the layers 33, 34 is dictated by the detector design.

In operation, the organic plastic scintillator 30 in the multiple radiation detector 36 of FIG. 3 detects neutrons and/or ionizing electromagnetic radiation in the same manner as the fast scintillator 13 of FIG. 1. The $^6$Li loaded glass fiber scintillation layers 32 detect thermal neutrons as in FIG. 1.

Figure 4:
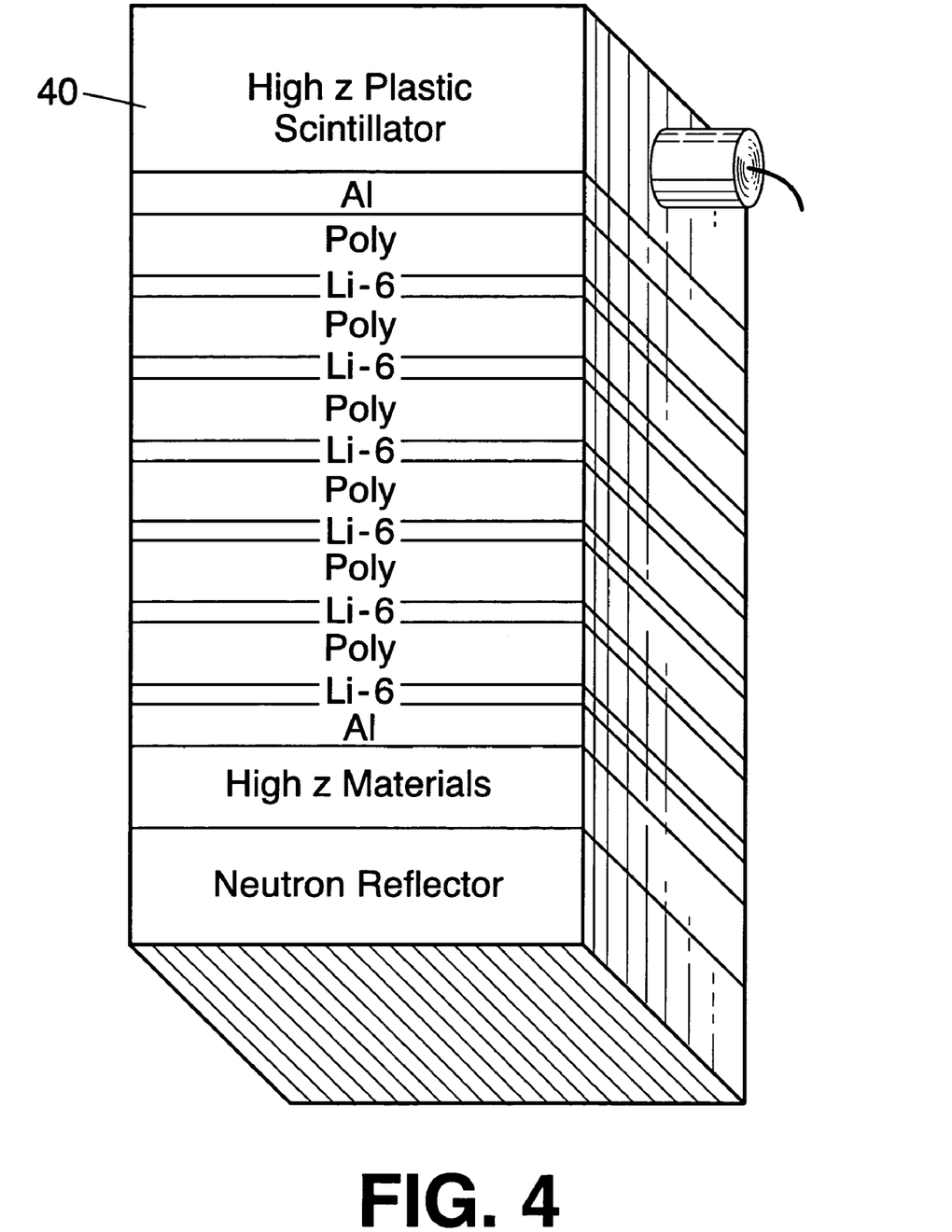
FIG. 4 illustrates a fast neutron, thermal neutron, and electromagnetic ionizing radiation detector based on a high atomic number loaded plastic scintillator in accordance with a further embodiment of the present invention.

In the embodiment of FIG. 4, a high atomic number loaded (e.g., heavy metal loaded) plastic scintillator 40 replaces the fast scintillator 13 of FIG. 1. It also operates the same as the scintillator 13 of FIG. 1.

Figure 5:
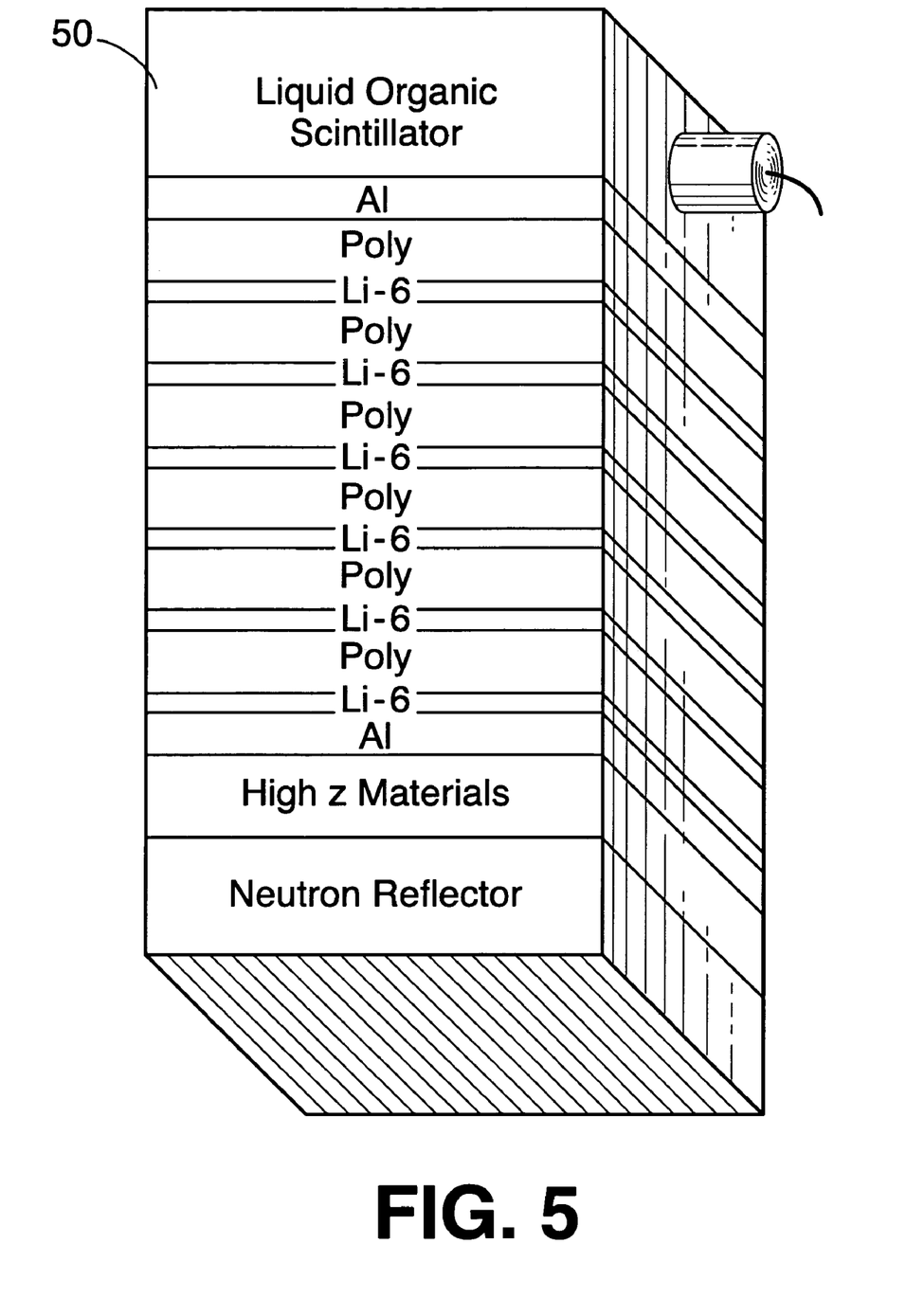
FIG. 5 illustrates a fast neutron, thermal neutron, and electromagnetic ionizing radiation detector based on a liquid organic scintillator in accordance with another embodiment of the present invention.

In the embodiment of FIG. 5, a liquid organic scintillator 50 replaces the fast scintillator 13 of FIG. 1. It operates the same as the scintillator 13 of FIG. 1 with the additional capability of pulse shape discrimination between ionizing electromagnetic radiation and neutrons.

Figure 6:
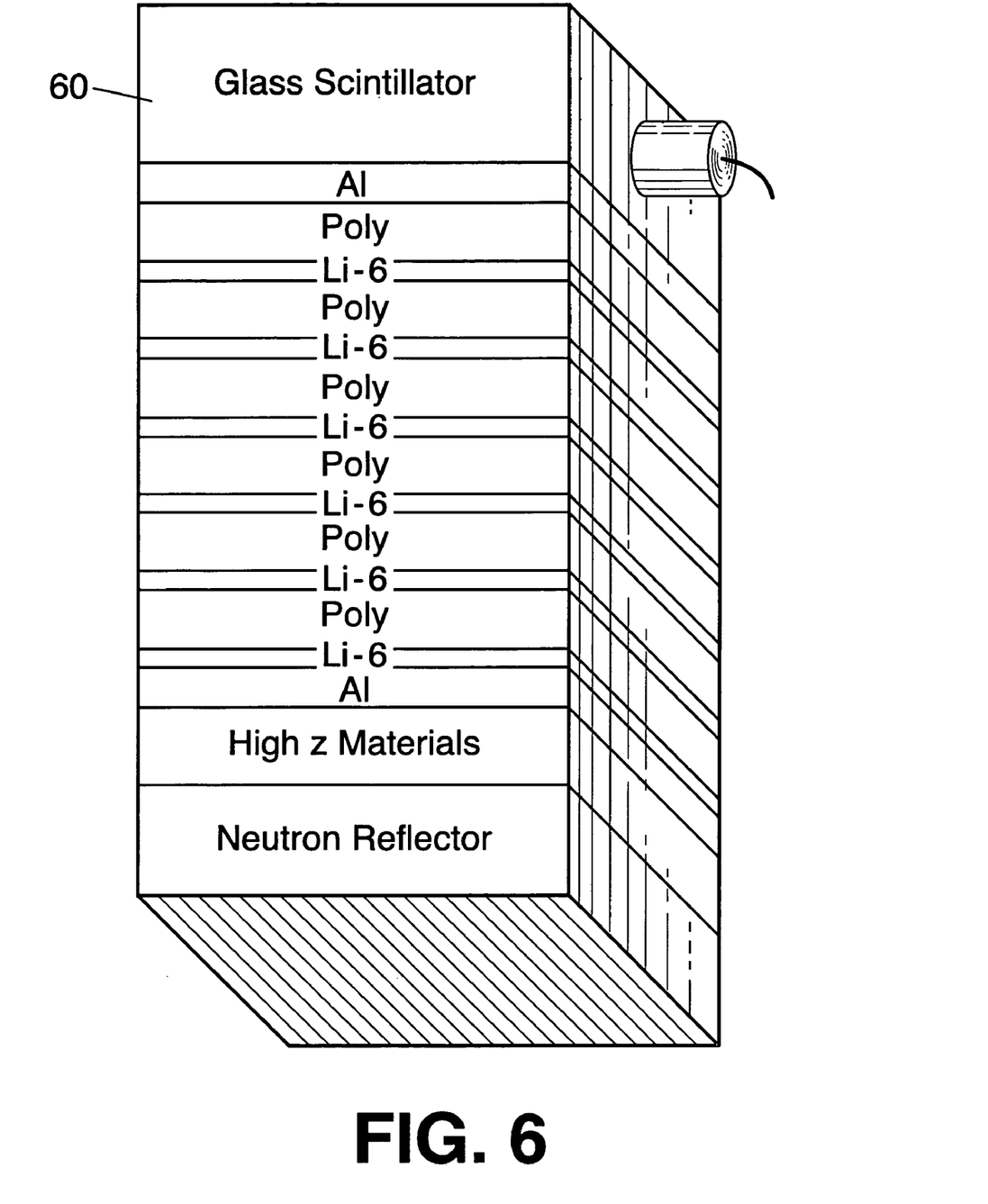
FIG. 6 illustrates a fast neutron, thermal neutron, and electromagnetic ionizing radiation detector based on a large glass scintillator sheet in accordance with yet another embodiment of the present invention.
Figure 7:
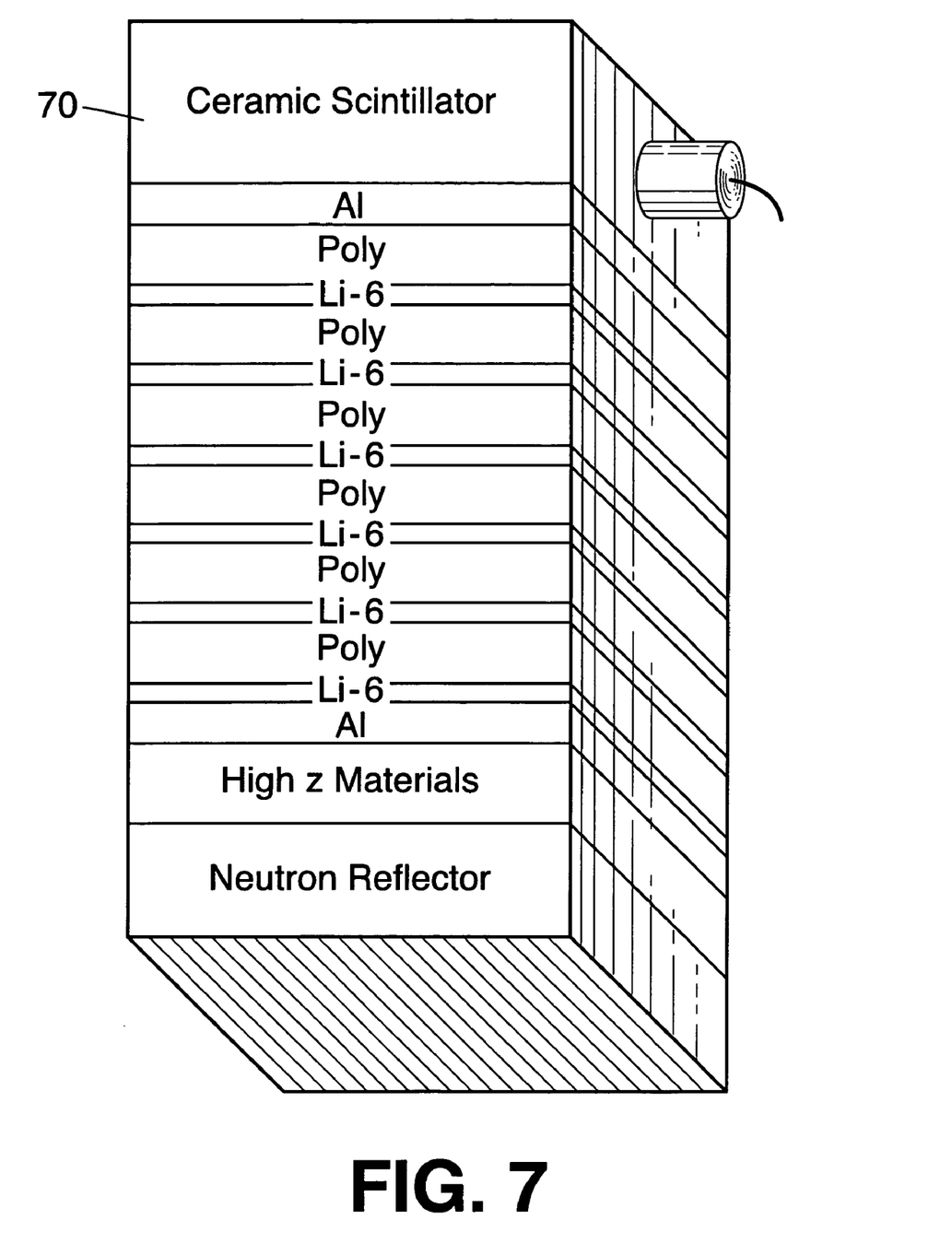
FIG. 7 illustrates a fast neutron, thermal neutron, and electromagnetic ionizing radiation detector based on a large transparent polycrystalline ceramic scintillator sheet in accordance with a still further embodiment of the present invention.

In the embodiment of FIG. 6, a large glass scintillation sheet detector 60 replaces the fast scintillator 13 of FIG. 1. It also operates the same as the scintillator 13 of FIG. 1. Substitution of a material with spectroscopic (energy) capabilities for the glass scintillator 60 would provide additional information about ionizing electromagnetic radiations. All elements have a unique ionizing electromagnetic radiation emission spectrum, thus allowing identification of the material in question. A limiting factor, however, is the energy resolution of the detector. A spectroscopic detector with limited energy resolution might not provide a unique spectrum, but it can provide another level of discrimination for improving the level of confidence of the detection of fissile or other nuclear materials of interest when used in concert with other techniques such as coincidence measurements.

In the embodiment of FIG. 7, a large transparent polycrystalline ceramic scintillator sheet detector 70 replaces the fast scintillator 13 of FIG. 1. It also operates the same as the scintillator 13 of FIG. 1.

The various detectors described herein may be used in either a passive or active mode. The passive mode relies only on the natural radioactivity (either spontaneous or induced by natural causes such as cosmic rays) of the material under interrogation while the active mode requires an external source under the control of the interrogator to induce reactions that lead to the production of neutrons and/or ionizing electromagnetic radiation. Active interrogation sources include but are not limited to pulsed LINACs, Californium (Cf) sources, and DT neutron generators.

The unified neutron and ionizing electromagnetic radiation detector described herein, combined with coincidence measurement techniques, reduces the detector footprint and cost relative to separate detectors and improves the signal-to-noise ratio of the detected signals. It is also realized that the materials normally used in both types of detectors lend themselves to applications in which large radiation detectors are necessary.

The detector described herein may be used in a variety of fixed or mobile modes, including, but not limited to (1) a personnel monitoring station, (2) a long range monitor for detection of neutrons of all energies and ionizing electromagnetic radiation, and (3) an equipment and/or container monitoring station.

The invention claimed is:

1. has been amended to recite the following:

A layer structure for detecting externally originating fast neutron, thermal neutron, and electromagnetic ionizing radiation comprising:
 a fast scintillator layer for receiving incoming fast neutron, thermal neutron, and electromagnetic ionizing radiation, said fast scintillator layer capable of detecting fast neutrons, x-rays and gamma rays;
 a plurality of Li-6 loaded glass fiber layers capable of detecting thermal neutrons, x-rays and gamma rays;
 a plurality of neutron moderating layers alternating between said Li-6 loaded glass fiber layers;
 a light shielding material surrounding said Li-6 loaded glass fiber layers and said moderating layers;
 a high atomic number material layer;
 and a neutron reflection layer.

2. The layer structure of claim 1 wherein said fast scintillator layer is an organic plastic scintillator layer.

3. The layer structure of claim 1 wherein said fast scintillator layer is a high atomic number loaded plastic scintillator layer.

4. The layer structure of claim 1 wherein said fast scintillator layer is a liquid organic scintillator.

5. The layer structure of claim 1 wherein said fast scintillator layer is a glass scintillator sheet.

6. The layer structure of claim 1 wherein said fast scintillator layer is an transparent polycrystalline ceramic scintillator sheet.

7. The layer structure of claim 1 wherein said neutron moderating layers are polyethylene.

8. The layer structure of claim 1 wherein said neutron moderating layers are ethafoam.

9. The layer structure of claim 1 wherein said light shielding material is aluminum.

* * * * *

UNITED STATES PATENT AND TRADEMARK OFFICE
Certificate

Patent No. 7,141,799 B1                  Patented: November 28, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: John S. Neal, Knoxville, TN (US); John T. Mihalczo, Oak Ridge, TN (US); and Carter Hull, Oak Ridge, TN (US).

Signed and Sealed this First Day of January 2008.

DAVID P. PORTA
*Supervisory Patent Examiner*
Art Unit 2884